United States Patent [19]

Asagiri et al.

[11] Patent Number: 5,421,615
[45] Date of Patent: Jun. 6, 1995

[54] SEAT BELT APPARATUS

[75] Inventors: Katsuki Asagiri; Yasuhiko Kouda, both of Aichi, Japan

[73] Assignee: Kabushiki Kaisha Tokai-Rika-Denki-Seisakusho, Aichi, Japan

[21] Appl. No.: 266,650

[22] Filed: Jun. 28, 1994

[30] Foreign Application Priority Data

Jun. 30, 1993 [JP] Japan ................. 5-036036

[51] Int. Cl.6 .............................. B60R 22/18
[52] U.S. Cl. .................... 280/808; 297/481; 297/482
[58] Field of Search ............... 280/808, 801.1; 297/468, 481, 482, 483; 24/588, 598.1, 598.4

[56] References Cited

U.S. PATENT DOCUMENTS

| 3,437,349 | 4/1969 | Feles et al. | 297/482 |
| 3,603,615 | 9/1971 | Stehouwer | 280/808 |
| 3,740,094 | 6/1973 | Hornyak | 297/481 |
| 4,272,104 | 6/1981 | Cuny | 280/808 |
| 4,575,119 | 3/1986 | Okuhara et al. | 280/801.1 |
| 4,635,963 | 1/1987 | Higuchi et al. | 280/801.1 |
| 4,822,104 | 4/1989 | Plesniarski | 297/482 |
| 5,158,339 | 10/1992 | Miyanaga | 297/482 |

FOREIGN PATENT DOCUMENTS

| 275253 | 6/1990 | Japan . | |
| 2135340 | 11/1990 | Japan . | |
| 495554 | 8/1992 | Japan . | |
| 1172458 | 12/1969 | United Kingdom | 297/481 |

*Primary Examiner*—Margaret A. Focarino
*Assistant Examiner*—Paul N. Dickson
*Attorney, Agent, or Firm*—Sixbey, Friedman, Leedom & Ferguson

[57] ABSTRACT

A seat belt apparatus in which a hook is formed on a boot covering an anchor plate. Accordingly, the hook can be engaged with an opening of a tongue plate during an assembly stage of a vehicle. As a result, the anchor plate can be held by the tongue plate, and it is therefore possible to prevent surface of a center pillar of a vehicle, which surface faces a vehicle compartment, from being damaged by the anchor plate.

20 Claims, 10 Drawing Sheets

SEAT BELT APPARATUS

BACKGROUND OF THE INVENTION

1. Field of the Invention

The present invention relates to a seat belt apparatus for restraining a vehicle occupant, and more particularly to a seat belt apparatus of the type in which an anchor member is attached to a side portion of an occupant seat.

2. Description of the Related Art

Although there exist various types of seat belt apparatuses designed to restrain a vehicle occupant by a webbing, a so-called three-point type seat belt apparatus will be described below as an example.

A three-point type seat belt apparatus is comprised of a take-up device disposed in the vicinity of the lower portion of a center pillar, a slip joint which is disposed on the upper portion of the center pillar and through which the intermediate portion of the webbing taken out from the take-up device passes through, an anchor plate with which the leading end of the webbing is engaged and which is fixed to the floor of a vehicle, and a tongue plate through which the intermediate portion of the webbing is passed and which is located between the anchor plate and the slip joint so as to be engageable with a buckle device. A vehicle occupant grasps the tongue plate, and engages it with the buckle device so as to bring the three-point seat belt apparatus into a fastened state in which the vehicle occupant is held or restrained by the portion of the webbing corresponding to the shoulder of the vehicle occupant and the portion of the webbing corresponding to the lap of the vehicle occupant.

Seat belt apparatuses of this kind have a drawback in that the attachment position of the anchor plate is stationary even when the passenger slides his or her seat along seat tracks to obtain a comfortable sitting feeling. To obviate this drawback, it has been proposed to attach the anchor plate to the side portion of the seat. In this case, the attachment position of the anchor plate is synchronously moved in accordance with the amount of the sliding movement of the seat when the vehicle occupant slides the seat along the seat tracks.

However, when the above-described structure is employed, the following drawback arises during the assembly stage of vehicles in a plant.

When a seat belt apparatus of the above-described structure is assembled in a plant, a take-up device is initially attached to a center pillar in the vicinity of the lower end thereof, and a slip joint is then attached to the upper portion of the center pillar. Subsequently, a seat is mounted to the floor of the vehicle, and an anchor plate is attached to a side portion of the seat. During the time between the attachment of the take-up device and the mounting of the seat, the vehicle is transported along an assembly line with the anchor plate being hung down from the slip joint via the webbing. Accordingly, there is the concern that an exposed portion (metallic portion) of the anchor plate will contact the surface of the center pillar facing the vehicle interior (or the surface of the pillar garnish facing the vehicle interior).

SUMMARY OF THE INVENTION

In view of the aforementioned, an object of the present invention is to provide an improved seat belt apparatus which can prevent the surface of a center pillar facing a vehicle compartment (hereinafter simply referred to as "compartment-facing surface of a center pillar") from being damaged by an anchor plate during the assembly stage of a vehicle.

According to a first aspect of the present invention, there is provided a seat belt apparatus including:
- a take-up device with which one longitudinal end portion of a webbing for restraining a vehicle occupant is engaged, for winding the webbing into a roll form;
- an intermediate webbing support member provided on a vehicle-compartment-facing side of an upper portion of a center pillar of a vehicle and having a pass-through opening through which a longitudinally intermediate portion of the webbing passes;
- an anchor member attached to a side portion of a passenger seat, another longitudinal end portion of the webbing being engaged with the anchor member, and the anchor member being covered by a cover member;
- a tongue plate which is located between the anchor plate and the intermediate webbing support member such that the longitudinally intermediate portion of the webbing is passed through the tongue plate, the tongue plate having an opening for engagement with a buckle device; and
- engagement means provided on the cover member and engaging with one of the opening of the tongue plate and the pass-through opening of the intermediate webbing support member so as to hold the anchor member at the one of the tongue plate and the intermediate webbing support member.

According to a second aspect of the present invention, there is provided a seat belt apparatus including:
- a take-up device with which one longitudinal end portion of a webbing for restraining a vehicle occupant is engaged, for winding the webbing into a roll form;
- an intermediate webbing support member which is provided on a vehicle-compartment-facing side of an upper portion of a center pillar of a vehicle and through which a longitudinally intermediate portion of the webbing passes;
- an anchor member attached to a side portion of a passenger seat, another longitudinal end of the webbing being engaged with the anchor member; and
- a tongue plate which is located between the anchor plate and the intermediate webbing support member such that the longitudinally intermediate portion of the webbing is passed through the tongue plate, the tongue plate being engaging with a buckle device,
- wherein at least one of the anchor member and one of the tongue plate and the intermediate webbing support member has magnetic force, and the anchor member and the one of the tongue plate and the intermediate webbing support member are magnetically adherable to each other.

To assemble the seat belt apparatuses according to the first and second aspects of the present invention, the take-up device is initially attached to a center pillar of a vehicle in a vicinity of the lower portion thereof, and the intermediate webbing support member is attached to the upper portion of the center pillar. Subsequently, a vehicle occupant seat is mounted to the floor of the vehicle, and the anchor member, with which the other end of the webbing for restraining a vehicle occupant is engaged, is attached to a side portion of the vehicle occupant seat.

In the seat belt apparatus according to the first aspect of the present invention, the cover member for covering the anchor member is provided with the engagement means. Therefore, the engagement means of the cover member can be engaged with either the opening of the tongue plate or the pass-through opening of the intermediate webbing support member, during the period of time from the attachment of the take-up device and the intermediate webbing support member to the attachment of the anchor member to the side portion of the vehicle occupant seat, so that the anchor member can be held by the tongue plate or the intermediate webbing support member. Accordingly, it is possible to prevent the compartment-facing surface of a center pillar (the surface of the pillar garnish which surface faces the vehicle interior) from being damaged by the anchor member.

In the seat belt apparatus according to the second aspect of the present invention, the anchor member and either the tongue plate or the intermediate webbing support member can adhere to each other due to magnetic force. Therefore, the anchor member can magnetically adhere to the tongue plate or the intermediate webbing support member, during the period of time from the attachment of the take-up device and the intermediate webbing support member to the attachment of the anchor member to the side portion of the vehicle occupant seat, so that the anchor member can be held by the tongue plate or the intermediate webbing support member. Accordingly, it is possible to prevent the compartment-facing surface of a center pillar from being damaged by the anchor member.

DESCRIPTION OF THE PREFERRED EMBODIMENT

A first embodiment of the present invention will be described below.

Figure 3:
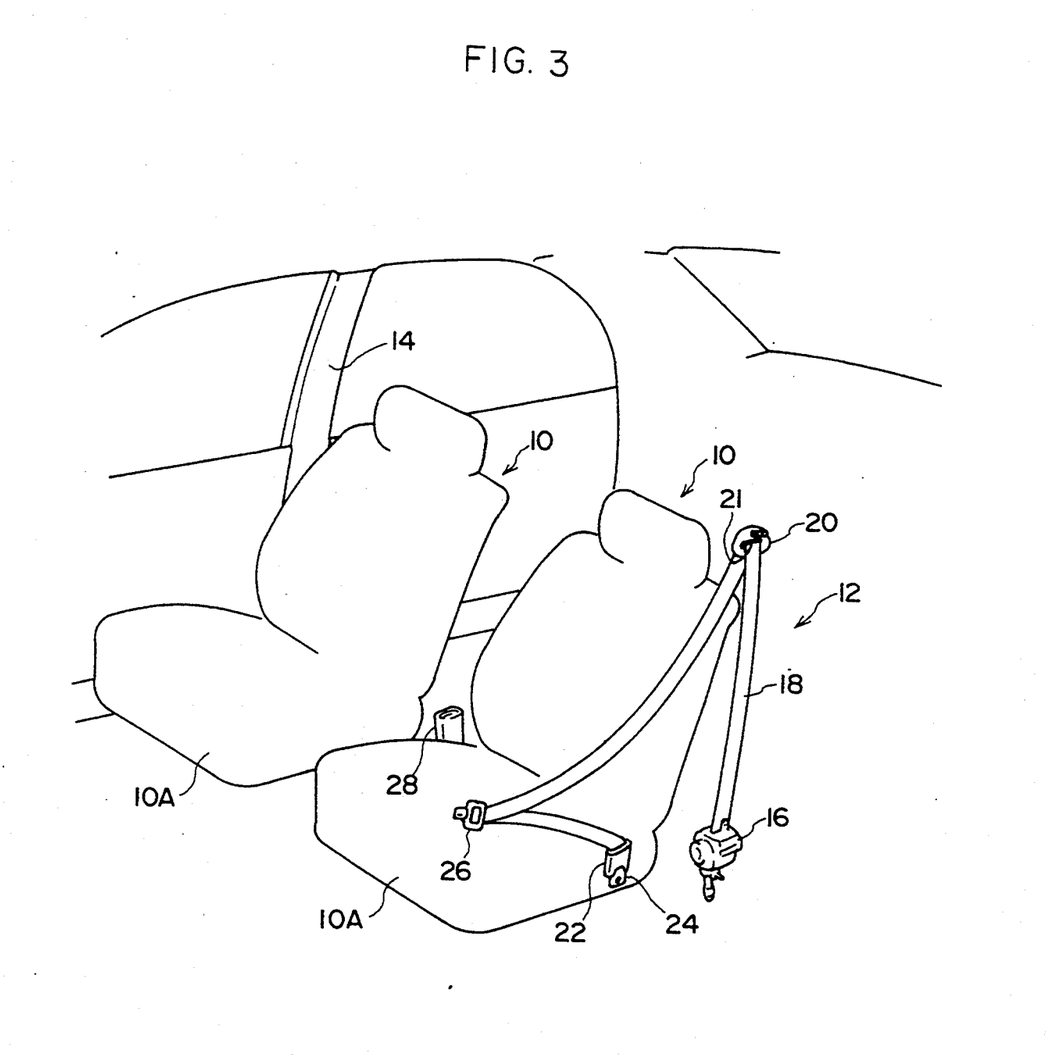
FIG. 3 is a perspective view showing the overall structure of the seat belt apparatus.

FIG. 3 shows a seat belt apparatus 12 for a front passenger seat 10. Although a similar seat belt apparatus is provided for a driver's seat, it is omitted from FIG. 3. A center pillar 14 at the passenger side is also omitted from FIG. 3.

The seat belt apparatus 12 is provided with a take-up device 16 which is disposed in the vicinity of the lower end of the center pillar 14, the compartment-facing surface of which is covered by a pillar garnish. The take-up device 16 includes therein a take-up shaft which is urged by an unillustrated power spring to rotate in a webbing take-up direction. One end of a webbing 18 for restraining a vehicle occupant is engaged with the taken-up shaft. The intermediate portion of the webbing 18 is supported by a slip joint 20 provided on the side of the upper portion of the center pillar 14, which side faces the vehicle compartment. The slip joint 20 acts as an intermediate webbing support means. The slip joint 20 has a long hole 21 (opening for passing) through which the webbing passes through. The other end of the webbing 18 is engaged with an anchor plate 24, serving as an anchor member, which is installed in a boot 22 serving as a cover member. This anchor plate 24 is attached to an outer side of a seat cushion 10A of the front passenger seat 10. Accordingly, when a vehicle occupant slides the seat 10 along unillustrated seat tracks, the attachment position of the anchor plate 24 is changed accordingly.

Further, the intermediate portion of the webbing 18 passes through a tongue plate 26, which is located between the slip joint 20 and the anchor plate 24. The tongue plate 26 is engageable with a buckle device 28 which is provided at a side portion of a seat cushion 10A of the front passenger seat 10 (i.e., at the side opposite to the side at which the anchor plate 24 is disposed). After a passenger sits on the seat cushion 10A of the front passenger seat 10, he or she engages the tongue plate 26 with the buckle device 28 so as to bring the three-point seat belt apparatus 12 into a fastened state in which the passenger is held or restrained by a shoulder holding portion of the webbing from the slip joint 20 to the tongue plate 26 and a lap holding portion of the webbing from the tongue plate 26 to the anchor plate 24.

Figure 1:
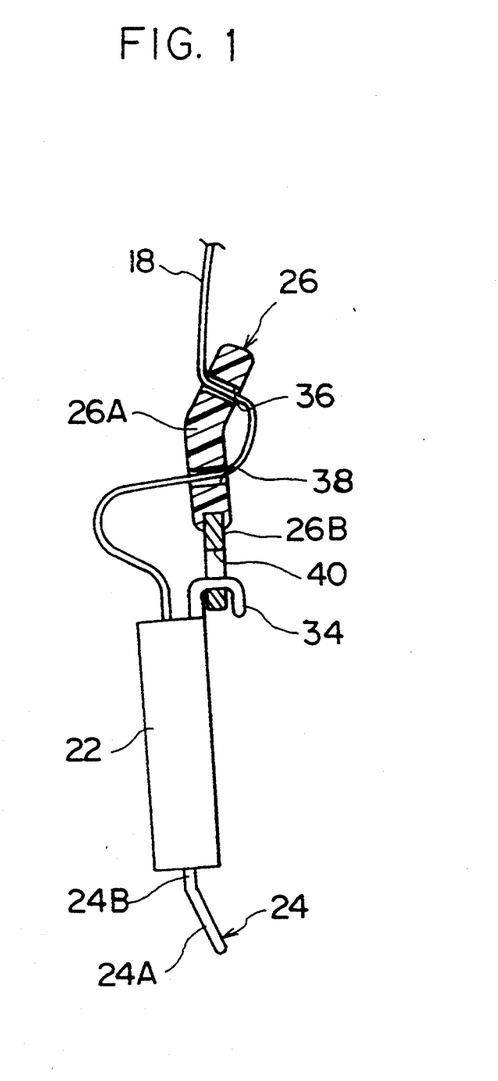
FIG. 1 is a partially sectioned side view of main portions of a seat belt apparatus according to a first embodiment of the present invention in a state in which a hook of a boot is engaged with an opening of an engagement portion of a tongue plate.
Figure 2:
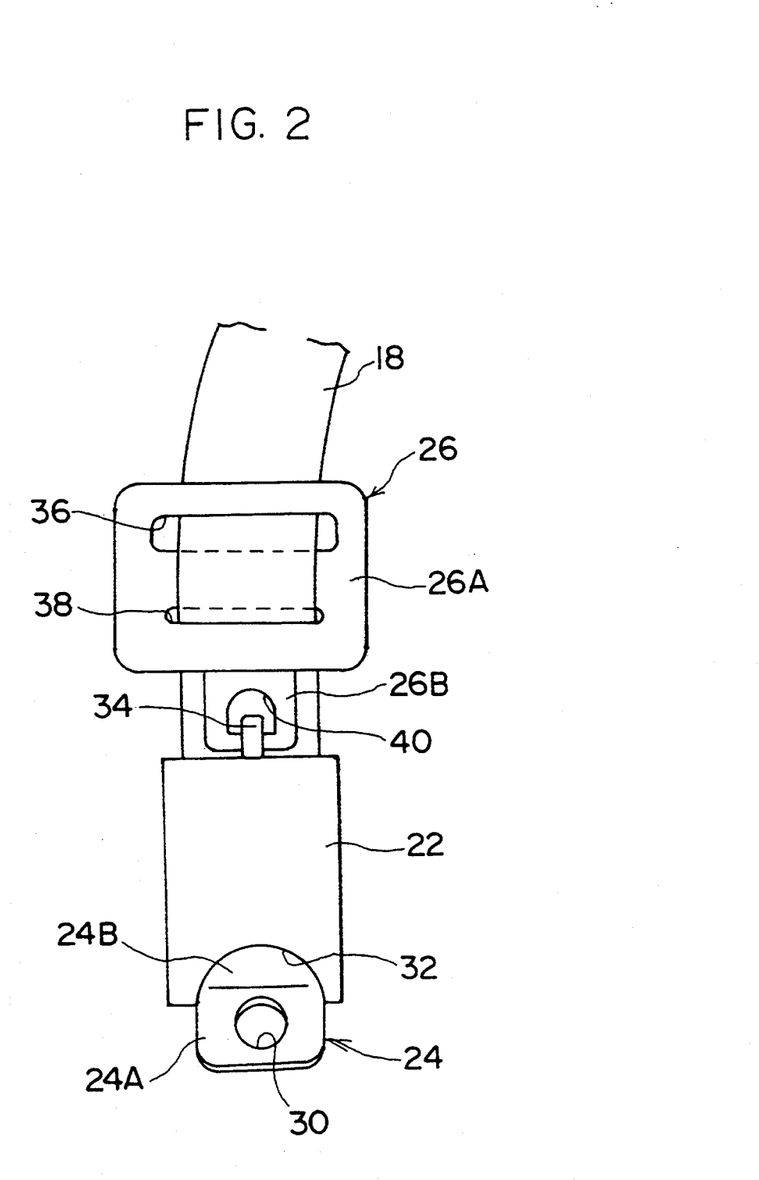
FIG. 2 is a front view of the portions shown in FIG. 1.

The anchor plate 24 is made of a metallic material having a predetermined strength, and is comprised of an attachment portion 24A which is attached to the side portion of the seat cushion 10A (see FIG. 3), and a webbing engaging portion 24B with which the other end of the webbing 18 is engaged. The attachment portion 24A of the anchor plate 24 is formed with a circular hole 30 through which a mounting bolt (not illustrated) is inserted. The webbing engaging portion 24B of the anchor plate 24 is formed with a long hole (not illustrated). The other end of the webbing 18 is passed though the long hole and is then folded back to form a loop for engagement.

The above-described webbing engaging portion 24B of the anchor plate 24 is covered by a tubular boot 22, which serves as a hollow body. A semicircular cutaway portion 32, from which the attachment portion 24A of the anchor plate 24 projects, is formed at one end portion of the boot 22. A hook 34 serving as an engagement means is integrally formed at the other end portion of the boot 22.

The tongue plate 26 is comprised of a pass-through portion 26A through which the intermediate portion of the webbing 18 passes, and an engagement portion 26B which protrudes from one side of the passing portion 26A. The pass-through portion 26A of the tongue plate 26 is formed with a pair of long holes 36 and 38 through which the webbing 18 is successively passed. The engagement portion 26B of the tongue plate 26 is formed with an opening 40. When the tongue plate 26 is engaged with the buckle device 28 (see FIG. 3), an unillustrated latch of the buckle device 28 is engaged with the opening 40 so that the tongue plate 26 and the buckle device 28 are locked.

During the assembly stage of a vehicle, the hook 34 of the boot 22 is engaged with the opening 40 of the engagement portion 26B of the tongue plate 26.

The seat 10 is moved along the seat tracks when an unillustrated operation knob is operated. The anchor plate 24 is therefore moved when the seat 10 is moved along the seat tracks.

Next, the operation of the present embodiment will be demonstrated by describing the assembly stage of a vehicle, with reference to FIG. 1 through FIG. 3.

Assembly of a vehicle which is to be equipped with the above-described seat belt apparatus 12 is carried out as follows.

Initially, the take-up device 16 is attached to the center pillar 14 in the vicinity of the lower end thereof, and the slip joint 20 is then attached to the upper portion of the center pillar 14. Subsequently, the seat 10 is mounted to the floor of the vehicle. Finally, the anchor plate 24 is attached to a side portion of the seat cushion 10A of the seat 10 by unillustrated mounting bolts.

The hook 34 of the boot 22 covering the anchor plate 24 is engaged with the opening 40 of the engagement portion 26B of the tongue plate 26 during the period of time from the attachment of the take-up device 16 and the slip joint 20 to the attachment of the anchor plate 24 to the side portion of the seat cushion 10A of the seat 10, so that the anchor plate 24 is held by the tongue plate 26. Namely, the movement of the anchor plate 24 is restricted to a certain extent by the engagement of the hook 34 with the opening 40 of the engagement portion 26B of the tongue plate 26. Accordingly, the anchor plate 24 is maintained in a state in which it does not contact the compartment-facing surface of the center pillar (the surface of the pillar garnish).

In the above-described embodiment, the hook 34 is formed on the boot 22 covering the anchor plate 24, and the hook 34 is engaged with the opening 40 of the engagement portion 26B of the tongue plate 26 so that the anchor plate 24 is held by the tongue plate 26, thereby preventing the anchor plate 24 from contacting the compartment-facing surface of the center pillar 14. Accordingly, it is possible to prevent the anchor plate 24 from damaging the compartment-facing surface of the center pillar 14 while the vehicle is being assembled.

Figure 4:
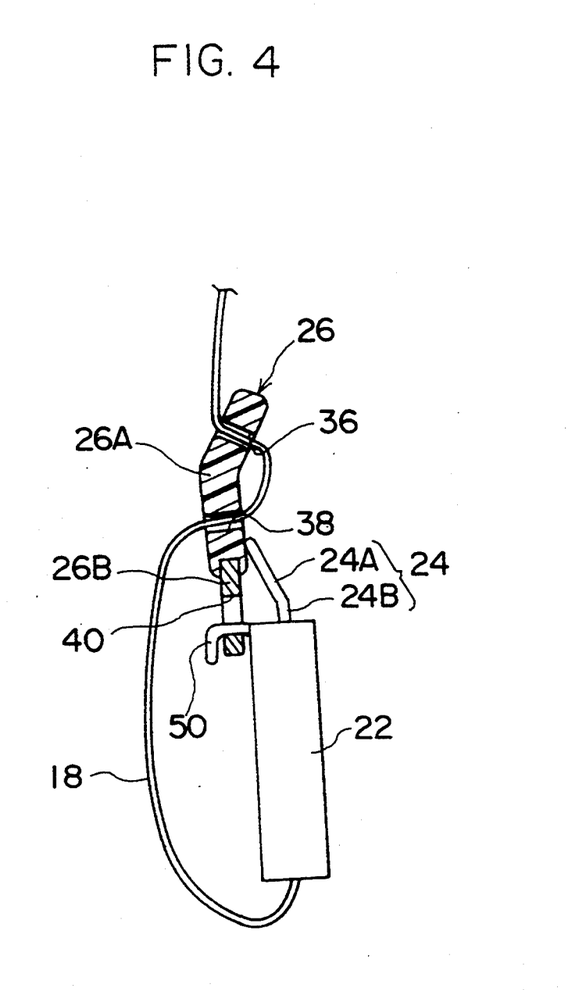
FIG. 4 is a side view of main portions of a seat belt apparatus according to a second embodiment of the present invention, corresponding to FIG. 1.
Figure 5:
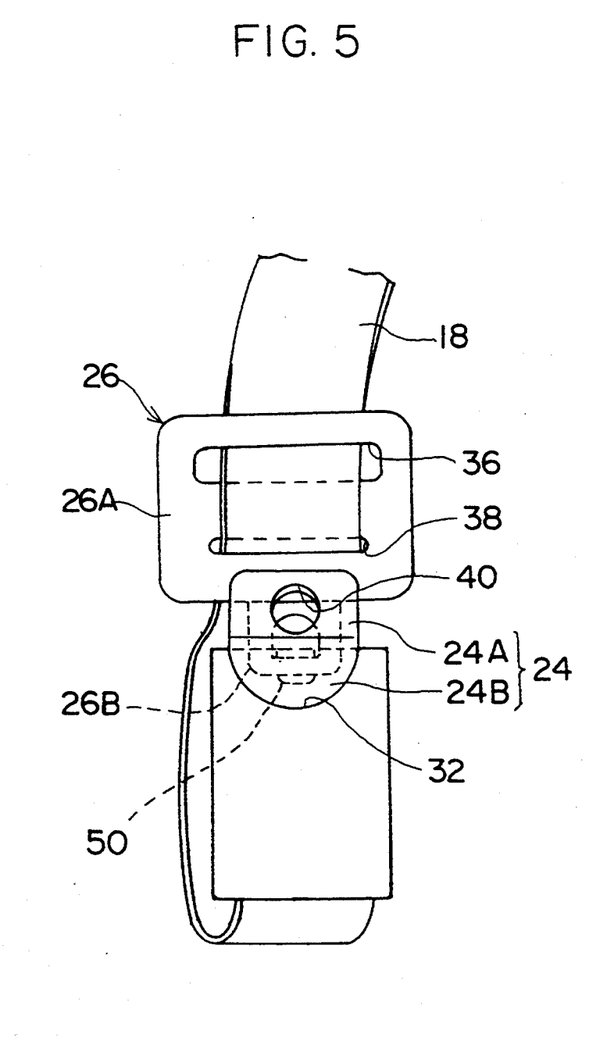
FIG. 5 is a front view of the portions shown in FIG. 4.

Next, a second embodiment of the present invention will be described with reference to FIG. 4 and FIG. 5.

In the present embodiment, the boot 22 is provided with an L-shaped hook 50 which is formed at the end of the boot 22 from which end the anchor plate 24 is projected, as shown in the drawings. The seat belt apparatus according to this embodiment functions and is operated in the same way as the above-described first embodiment and achieves the same effect as the first embodiment.

Figure 6:
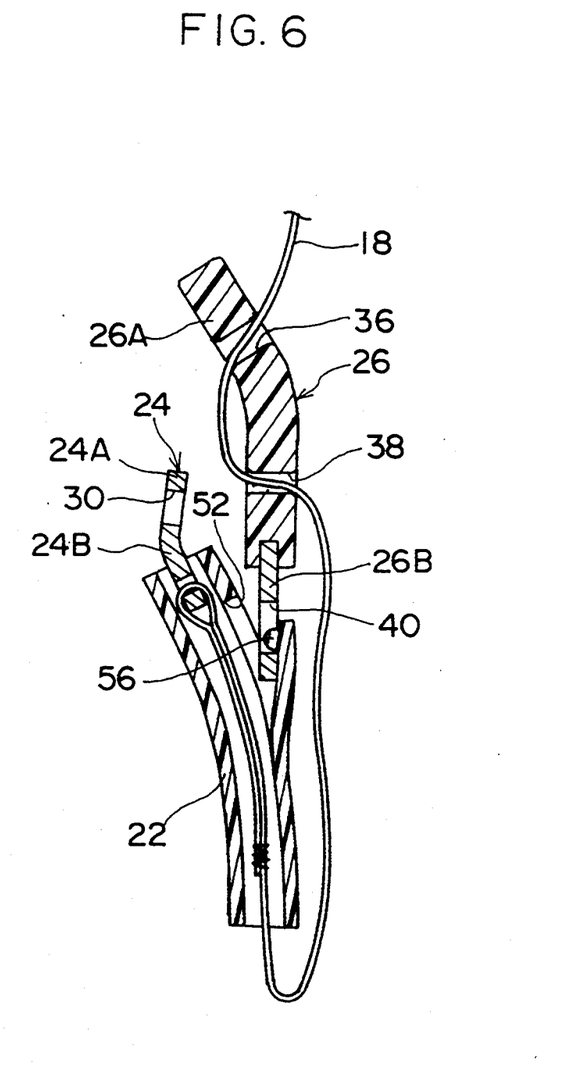
FIG. 6 is a sectional view of main portions of a seat belt apparatus according to a third embodiment of the present invention, corresponding to FIG. 1.
Figure 7:
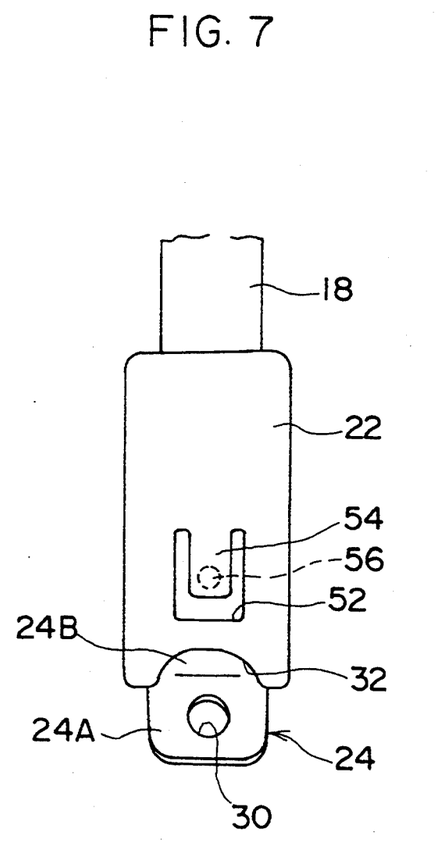
FIG. 7 is a front view of the portions shown in FIG. 6.

Next, a third embodiment of the present invention will be described with reference to FIG. 6 and FIG. 7.

As shown in these drawings, in the present embodiment, substantially U-shaped groove 52 is formed at a longitudinally intermediate portion of the boot 22. This groove 52 forms a rectangular pawl portion 54 which can be resiliently deformed. Further, a protrusion 56 is formed on the inner surface of pawl portion 54 at the center thereof.

In the seat belt apparatus having the above-described structure, the groove 52 of the boot 22 is engaged with an engagement portion 26B of a tongue plate 26 due to resilient deformation of the pawl portion 54 of the anchor plate 24. Alternatively, the engagement portion 26B of the tongue plate 26 is inserted into the groove 52. Due to this operation, the boot 22, i.e., the anchor plate 24, is held by the tongue plate 26.

The seat belt apparatus according to the present embodiment achieves not only the same effect as the above-described embodiments, but also provides an advantage in that no protrusions are exposed from the boot 22 during ordinary use.

Figure 8:
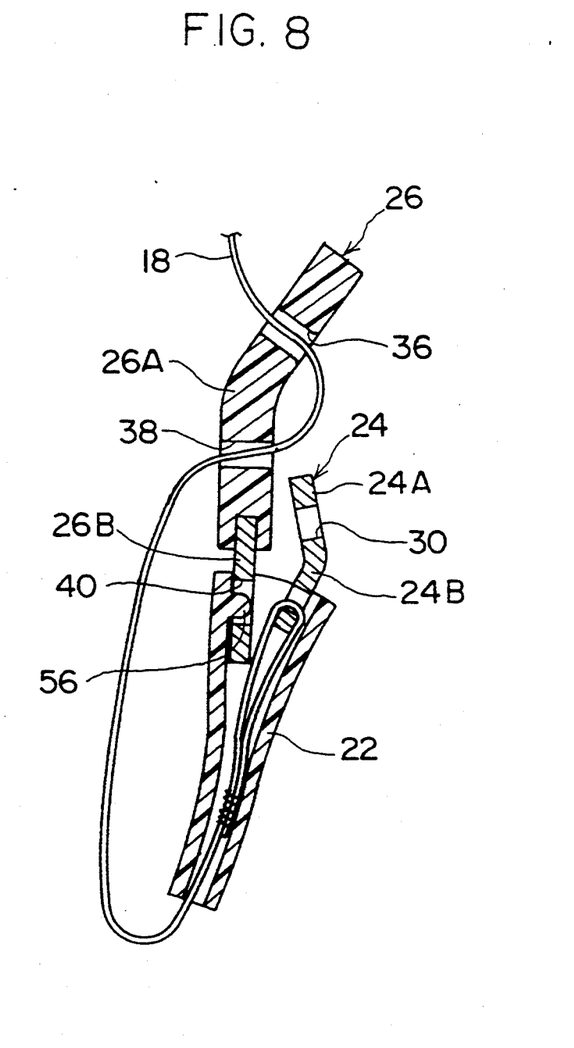
FIG. 8 is a sectional view of main portions of a seat belt apparatus according to a fourth embodiment of the present invention, corresponding to FIG. 6.
Figure 9:
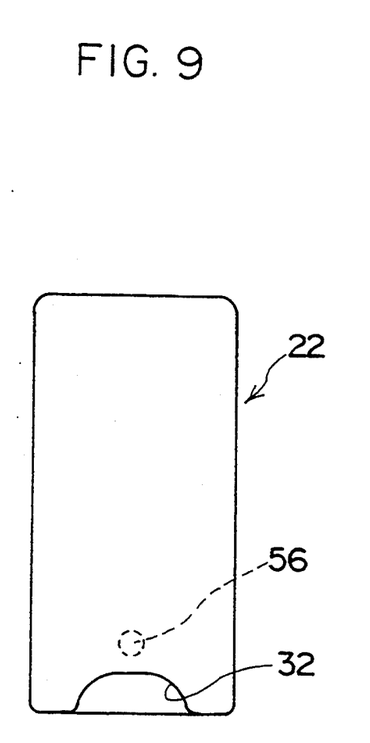
FIG. 9 is a front view of the portions shown in FIG. 8.

Next, a fourth embodiment of the present invention will be described with reference to FIG. 8 and FIG. 9. In FIG. 9, only the boot 22 is shown.

As shown in these drawings, the protrusion 56 is formed directly on the inner surface of the boot 22. In accordance with the above-described structure, the boot 22 is engaged with the engagement portion 26B of the tongue plate 26, or the engagement portion 26B of the tongue plate 26 is inserted into the boot 22. Due to this operation, the protrusion 56 of the boot 22 enters the opening 40 of the engagement portion 26B of the tongue plate 26 so that the boot 22, i.e., the anchor plate 24, is held by the tongue plate 26.

The seat belt apparatus according to the present embodiment achieves not only the same effect as the above-described third embodiment, but also provides an advantage in that production of the boot is easier than production of the boot in the third embodiment.

Next, a fifth embodiment of the present invention will be described with reference to FIG. 10. In this embodiment, an anchor plate 58 which is a magnet is employed. The engagement portion 26B of the tongue plate 26 is made of a magnetic metal having a high strength, as in the conventional art.

In the seat belt apparatus according to the present embodiment, the anchor plate 58 is held by the tongue plate 26 by magnetic attraction of the anchor plate 58 to the engagement portion 26B of the tongue plate 26.

Accordingly, in the same way as the above-described embodiments, it is possible to prevent the anchor plate 58 from damaging the compartment-facing surface of the center pillar 14. Further, since the seat belt apparatus according to the present embodiment does not require any additional structural elements to be added to the boot 22 or the like, it is not necessary to modify the shapes of other parts (for example, the attachment position of the anchor plate 58 on the side portion of the sheet cushion 10A).

In the first through the fourth embodiments, although the hook 34 or the protrusion 56 is integrally formed on the boot 22, the present invention is not limited to the same and the structure may be modified so that the hook 34 or the like is detachably attached to the boot 22.

Although the hook 34 or the protrusion 56 is engaged with the opening 40 of the tongue plate 26, the present invention is not limited to the same and the hook 34 or the protrusion 56 may be engaged with the long hole 21 of the slip joint 20.

Figure 10:
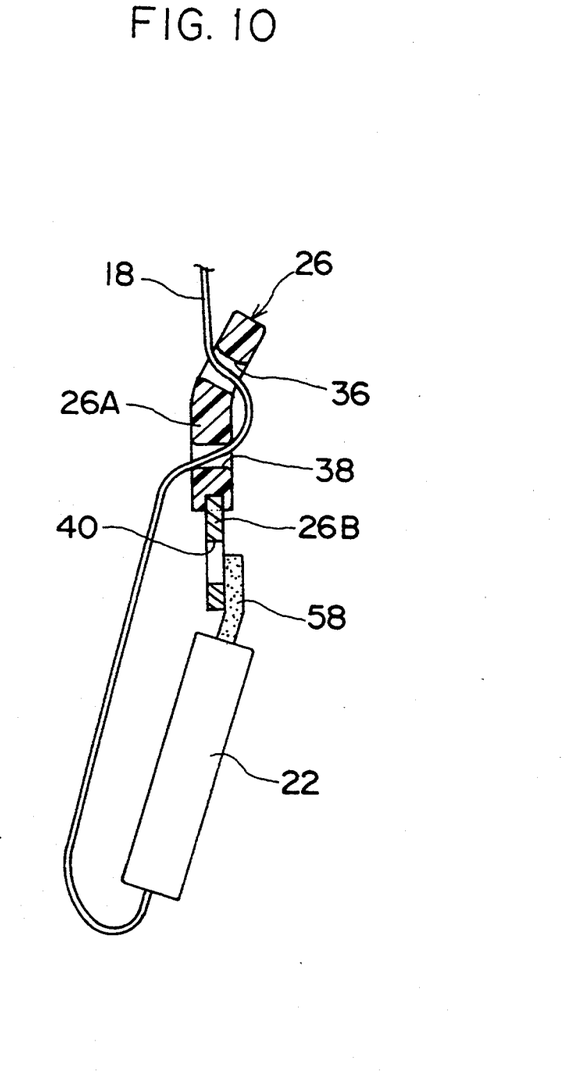
FIG. 10 is a side view of an anchor plate, a tongue plate and the like of a seat belt apparatus according to a fifth embodiment of the present invention, corresponding to FIG. 1.

In the embodiment shown in FIG. 10, the anchor plate 58 is a magnet. However, in a case in which no electrical components affected by magnetism are built in the buckle device 28, the engagement portion 26B of the tongue plate 26 may be magnet instead of the anchor plate 58, or both the anchor plate 58 and the engagement portion 26B of the tongue plate 26 may be magnets (one would have an N-pole while the other would have an S-pole). Further, structures are possible in which only a portion of the slip joint 20 is magnetic, or respective portions of the slip joint 20 and the anchor plate 58 are magnetic. In the fifth embodiment, although the entire anchor plate 58 is made of a permanent magnetic material, the present invention is not limited to the same, and, for example, the structure may be modified so that a magnet is disposed on (or attached to) the metallic anchor plate 58.

Although the anchor plate 58 and the tongue plate 26 are magnetically attached to each other in the embodiment shown in FIG. 10, the anchor plate 58 and the slip joint 20 may be magnetically attached to each other. In this case, the slip joint 20 must be made of a magnetic metal.

What is claimed is:

1. A seat belt apparatus comprising:
   a take-up device with which one longitudinal end portion of a webbing for restraining a vehicle occupant is engaged, for winding said webbing into a roll form;
   an intermediate webbing support member provided on a vehicle-compartment-facing side of an upper portion of a center pillar of a vehicle and having a pass-through opening through which a longitudinally intermediate portion of said webbing passes;
   an anchor member attachable to a side portion of a passenger seat, another longitudinal end portion of said webbing being engaged with said anchor member, and said anchor member being covered by a cover member;
   a tongue plate which is located between said anchor member and said intermediate webbing support member such that the longitudinally intermediate portion of said webbing is passed through said tongue plate, said tongue plate having an opening for engagement with a buckle device; and
   engagement means provided on said cover member and engaging with one of the opening of said tongue plate and the pass-through opening of said intermediate webbing support member so as to hold said anchor member at said one of said tongue plate and said intermediate webbing support member.

2. A seat belt apparatus according to claim 1, wherein said engagement means is a first hook formed at one longitudinal end portion of said cover member which end portion is opposite to another longitudinal end portion from which a tip portion of said anchor member projects.

3. A seat belt apparatus according to claim 2, wherein said first hook is integrally formed with said cover member.

4. A seat belt apparatus according to claim 2, wherein said first hook is formed in a substantially U-shaped configuration, and one end portion of said first hook is connected to said cover member, and another end portion of said first hook protrudes from said cover member and is directed in a longitudinal direction of said cover member.

5. A seat belt apparatus according to claim 1, wherein said engagement means is a second hook formed in a vicinity of one longitudinal end portion of said cover member from which a tip portion of said anchor member projects.

6. A seat belt apparatus according to claim 5, wherein said second hook is integrally formed with said cover member.

7. A seat belt apparatus according to claim 5, wherein said second hook is formed in a substantially L-shaped configuration, and one end portion of said second hook is connected to said cover member, and another end portion of said second hook protrudes from said cover member and is directed in a longitudinal direction of said cover member.

8. A seat belt apparatus according to claim 1, wherein said engagement means is a pawl portion provided on said cover member at a longitudinally intermediate portion thereof.

9. A seat belt apparatus according to claim 8, wherein said pawl portion is provided with a first protrusion formed on an inner surface of said pawl portion as viewed in a direction of thickness of said cover member, and said first protrusion is engageable with one of the opening of said tongue plate and the pass-through opening of said intermediate webbing support member.

10. A seat belt apparatus according to claim 8, wherein said pawl portion is integrally formed with said cover member.

11. A seat belt apparatus according to claim 8, wherein said pawl portion is provided such that a tip portion thereof is directed in a substantially same direction as a direction in which a tip portion of said anchor member is directed.

12. A seat belt apparatus according to claim 1, wherein said engagement means is a second protrusion provided on an inner surface of said cover member, as viewed in a direction of thickness of said cover member, in a vicinity of a longitudinal end portion of said cover member.

13. A seat belt apparatus according to claim 12, wherein said second protrusion is provided in a vicinity of an end portion of said cover member from which a tip portion of said anchor member projects.

14. A seat belt apparatus according to claim 1, wherein said cover member is a hollow body, and a tip portion of said anchor member penetrates said hollow body.

15. A seat belt apparatus comprising:
   a take-up device with which one longitudinal end portion of a webbing for restraining a vehicle occupant is engaged, for winding said webbing into a roll form;
   an intermediate webbing support member which is provided on a vehicle-compartment-facing side of an upper portion of a center pillar of a vehicle and through which a longitudinally intermediate portion of said webbing passes;
   an anchor member attachable to a side portion of a passenger seat, another longitudinal end of said webbing being engaged with said anchor member; and a tongue plate which is located between said anchor plate and said intermediate webbing support member such that the longitudinally intermediate portion of said webbing is passed through said tongue plate, said tongue plate being engageable with a buckle device, wherein at least one of said anchor member and said tongue plate and said intermediate webbing support member has magnetic force, and said anchor member and said one of said tongue plate and said intermediate webbing support member are magnetically adhered to each other.

16. A seat belt apparatus according to claim 15, wherein at least a portion of said anchor member is a magnet.

17. A seat belt apparatus according to claim 16, wherein at least a portion of one of said tongue plate and said intermediate webbing support member which magnetically adheres to said anchor member is a magnet.

18. A seat belt apparatus according to claim 16, wherein one of said tongue plate and said intermediate webbing support member which magnetically adheres to said anchor member is formed of a magnetic material.

19. A seat belt apparatus according to claim 15, wherein said anchor member is formed of a metal.

20. A seat belt apparatus according to claim 16, wherein at least a portion of one of said tongue plate and said intermediate webbing support member which adheres to said anchor member is a magnet.

* * * * *